(12) United States Patent
Chan et al.

(10) Patent No.: US 6,775,087 B2
(45) Date of Patent: Aug. 10, 2004

(54) METHOD AND APPARATUS TO READ PAST EOD MARKER

(75) Inventors: Nathan Chan, Sunnyvale, CA (US); Paresh J. Desai, San Jose, CA (US); Shinichiro Ken Torii, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 301 days.

(21) Appl. No.: 09/884,803

(22) Filed: Jun. 18, 2001

(65) Prior Publication Data

US 2003/0043492 A1 Mar. 6, 2003

(51) Int. Cl.$^7$ ............................................. G11B 15/48
(52) U.S. Cl. ........................................................ 360/74.1
(58) Field of Search ............................ 360/74.1, 74.4, 360/72.1, 48, 60, 69, 77.14, 77.15, 32, 72.2, 72.3, 27; 711/111, 162

(56) References Cited

U.S. PATENT DOCUMENTS

| | | | |
|---|---|---|---|
| 4,682,292 A | * 7/1987 | Bue et al. ...................... 701/35 |
| 5,084,787 A | * 1/1992 | Hunter et al. .................. 360/32 |
| 5,163,136 A | * 11/1992 | Richmond ....................... 710/30 |
| 5,377,056 A | * 12/1994 | Jones ........................... 360/74.1 |
| 5,384,669 A | 1/1995 | Dunn et al. |
| 5,448,427 A | * 9/1995 | Masuda et al. ................ 360/72.1 |
| 5,546,246 A | * 8/1996 | Klomp et al. .................. 360/72.2 |
| 5,608,585 A | * 3/1997 | Masuda et al. ................ 360/72.1 |
| 5,638,229 A | * 6/1997 | Shingu et al. ................. 360/72.3 |
| 5,671,350 A | 9/1997 | Wood |
| 5,710,676 A | * 1/1998 | Fry et al. ..................... 360/72.1 |
| 5,757,571 A | 5/1998 | Basham et al. |
| 5,758,151 A | 5/1998 | Milligan et al. |
| 5,818,652 A | * 10/1998 | Ozaki et al. ................... 360/27 |
| 5,823,486 A | 10/1998 | Sugiuama et al. |
| 6,023,388 A | * 2/2000 | Ikeda et al. ................. 360/72.1 |
| 6,029,229 A | 2/2000 | Vishlitzky |
| 6,093,925 A | * 7/2000 | Maeda et al. ............. 250/222.1 |
| 6,134,066 A | * 10/2000 | Takayama et al. ............ 360/60 |
| 6,182,191 B1 | * 1/2001 | Fukuzono et al. .......... 711/111 |
| 6,288,862 B1 | 9/2001 | Baron et al. |
| 6,301,067 B1 | 10/2001 | Takayama |
| 6,307,700 B1 | 10/2001 | Takayama |
| 6,366,987 B1 | 4/2002 | Tzelnic et al. |
| 6,417,978 B1 | * 7/2002 | Enomoto ..................... 360/72.2 |
| 6,501,612 B1 | * 12/2002 | Kato et al. .................... 360/69 |
| 6,535,344 B1 | * 3/2003 | Takayama ..................... 360/60 |
| 6,580,576 B1 | * 6/2003 | Takayama ..................... 360/69 |
| 6,587,298 B1 | * 7/2003 | Yamada ...................... 360/72.1 |
| 6,603,624 B1 | * 8/2003 | Takayama ..................... 360/69 |
| 6,618,795 B2 | * 9/2003 | Chan et al. ................. 711/162 |

OTHER PUBLICATIONS

Rosenblum et al., "The Design and Implementation of a Log–Structured File System:, ACM Transactions on Computer Systems", vol. 10, No. 1, Feb. 1992, pp. 26–52.

* cited by examiner

Primary Examiner—David Hudspeth
Assistant Examiner—Fred F. Tzeng
(74) Attorney, Agent, or Firm—Blakely, Sokoloff, Taylor & Zafman LLP

(57) ABSTRACT

A data storage device having a read-past-EOD marker flag is described herein. The read-past-EOD marker flag may be stored in a non-volatile memory, such as EEPROM, coupled to the data storage device. In one embodiment, the data storage device is a magnetic tape cartridge. The read-past-EOD marker flag, when set to an "on" position, may enable a magnetic tape drive to read past an EOD marker stored on the magnetic tape.

15 Claims, 11 Drawing Sheets

METHOD AND APPARATUS TO READ PAST EOD MARKER

FIELD OF THE INVENTION

This invention relates generally to magnetic storage media, and more particularly to magnetic tape cartridges incorporating a non-volatile memory.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Sony Electronics, Inc., All Rights Reserved.

BACKGROUND OF THE INVENTION

Magnetic tapes are sequential storage media capable of efficiently and reliably storing large amounts of data. Because of their large storage capacity and relatively low cost, magnetic tapes are commonly used for data backup. A backup server in a network can utilize one or more magnetic tape drives to automatically backup files stored on user computers connected to the network. Magnetic tapes are also used for storage management, multimedia storage and retrieval, real-time data acquisition, and transporting large amounts of data.

Although magnetic tapes offer the aforementioned advantages, they are relatively slow compared with other mass storage devices such as hard disks. Consequently, efforts have been made to decrease access time to data stored on a magnetic tape. One method of increasing the speed of data access involves incorporating a non-volatile memory into the magnetic tape cartridge. System log information may be stored in the non-volatile memory, enabling a tape drive to quickly locate and access a data file stored in a particular partition along the magnetic tape.

A magnetic tape incorporating a non-volatile memory may be formatted to include a series of partitions. One or more data files may be stored within a data area in a particular partition. A user may wish to delete a data file stored on the magnetic tape. There are a variety of possible methods of deleting data on a magnetic tape. One method, which is the most commonly used method of erasing data from a magnetic tape, is to simply overwrite the original data with new data. An end-of-data (EOD) marker is recorded after the new data that indicates where the tape drive stopped overwriting the original data.

A user may accidentally overwrite original data in an overwrite operation. The original data that was written over typically is lost and cannot be recovered. However, some of the original data may still exist past the EOD marker marking the end of the new data. By reading past an EOD marker, a user can recover original data past the EOD marker that was not overwritten. In the past, customized firmware was used to enable a user to read past the EOD marker. However, using customized firmware is costly, inconvenient, and time consuming because the tape drive must be updated with the new firmware.

SUMMARY OF THE INVENTION

A method and apparatus to read past an EOD marker on a magnetic tape is described herein. In one embodiment, a data storage device includes a casing, a pair of spools enclosed within the casing, a magnetic tape coiled around and extending between the spools, and a read-past-EOD marker flag stored in the data storage device. The read-past EOD marker flag may be located in a non-volatile memory coupled to the data storage device.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DISCUSSION

In the following detailed description of embodiments of the invention, numerous specific details are set forth such as examples of specific materials, machines, and methods in order to provide a thorough understanding of the present invention. It will be apparent, however, to one skilled in the art that these specific details need not be employed to practice the present invention. In other instances, well known materials, machines, or methods have not been described in detail in order to avoid unnecessarily obscuring the present invention.

A magnetic tape having a non-volatile memory that stores a flag enabling a magnetic tape drive to read past an end-of-data (EOD) marker is disclosed herein. The EOD marker may indicate the end of the last recorded data on the magnetic tape. In one embodiment, the flag is stored in the non-volatile memory via a small computer system interface (SCSI) command. In another embodiment, the flag is stored in the non-volatile memory via an application. In another embodiment, the flag is stored in the non-volatile memory via a portable electronic device, such as a personal digital assistant (PDA). In a further embodiment, the PDA may have a radio frequency (RF) module or any other form of wireless communications device such as an infrared (IR) module.

Figure 1:
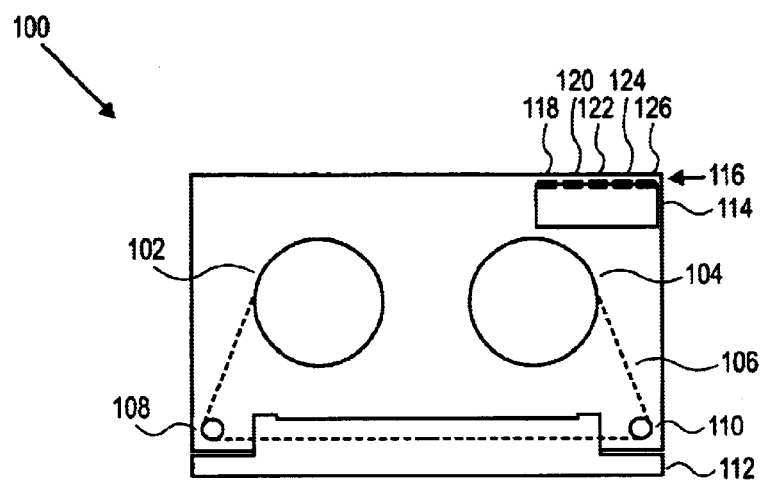
FIG. 1 is a plan view illustrating one embodiment of a magnetic tape cartridge.

FIG. 1 is a plan view illustrating one embodiment of a magnetic tape cartridge 100. Magnetic tape cartridge 100 has spools 102 and 104, around which a magnetic tape 106 is coiled. Magnetic tape 106 typically has a base, a back coat disposed above one surface of the base, a magnetic layer disposed above the other surface of the base, a protective layer disposed above the magnetic layer, and a lubricant disposed above the protective layer. The magnetic layer may be a metal such as cobalt or a cobalt/nickel alloy. Alternatively, the magnetic layer may be a ferromagnetic material, such as ferric oxide ($Fe_2O_3$). The ferric oxide may be mixed with another metallic oxide such as chromium dioxide ($CrO_2$). The magnetic layer becomes permanently magnetized in the presence of a magnetic field, enabling data to be stored on and retrieved from magnetic tape 106. Magnetic tape 106 may be guided by guides 108 and 110 such that a portion of magnetic tape 106 is close to one edge of magnetic tape cartridge 100. A guard panel 112 may cover the portion of magnetic tape 106 that is close to the edge of magnetic tape cartridge 100.

A non-volatile memory 114 may be disposed on or contained within magnetic tape cartridge 100. Non-volatile memory 114 may be any type of non-volatile memory, such as Erasable Programmable Read-Only Memory (EPROM), Electrically-Erasable Programmable Read-Only Memory (EEPROM), or flash memory. Non-volatile memory 114 may be used to store various types of information about magnetic tape cartridge 100 and magnetic tape 106, as described below in further detail. Magnetic tape cartridge 100 may also have an interface 116 to facilitate communication between non-volatile memory 114 and a magnetic tape drive. Interface 116 may include terminal pins 118, 120, 122, 124, and 126. In alternative embodiments, interface 116 may have more or less than five terminal pins.

An example of a magnetic tape cartridge incorporating a non-volatile memory devce is the 8 mm Advanced Intelligent Tape (AIT), manufactured by Sony Electronics, Inc. of Tokyo, Japan. The Sony 8 mm AIT tape includes a 16 kbit EEPROM chip incorporated into the tape cartridge. The EEPROM chip stores information that enables an AIT-compatible tape drive to, among other things, access data at any one of up to 256 partitions in the magnetic tape without rewinding to the beginning of the magnetic tape and reading the system log to find the desired file. The Sony 8 mm AIT tape also includes a 5 pin interface for communicating with an AIT-compatible tape drive.

Figure 2:
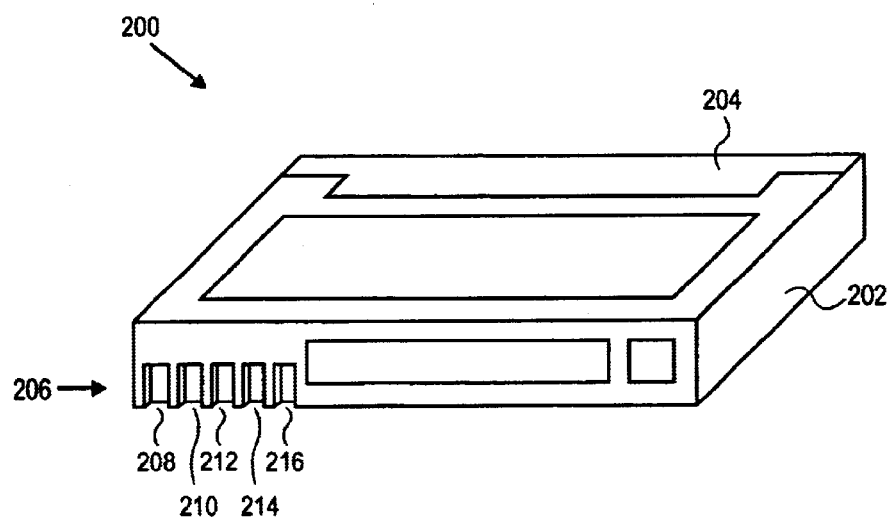
FIG. 2 is a perspective view illustrating one embodiment of a magnetic tape cartridge.

FIG. 2 is a perspective view illustrating one embodiment of a magnetic tape cartridge 200. In one embodiment, magnetic cartridge 200 corresponds to magnetic cartridge 100 discussed above with respect to FIG. 1. Magnetic tape cartridge 200 may include a casing 202 and a guard panel 204. Magnetic tape cartridge 200 also may include a non-volatile memory (not shown) and an interface 206 to facilitate communication between the non-volatile memory and a magnetic tape drive. Interface 206 may include terminal pins 208, 210, 212, 214, and 216.

Figure 3:
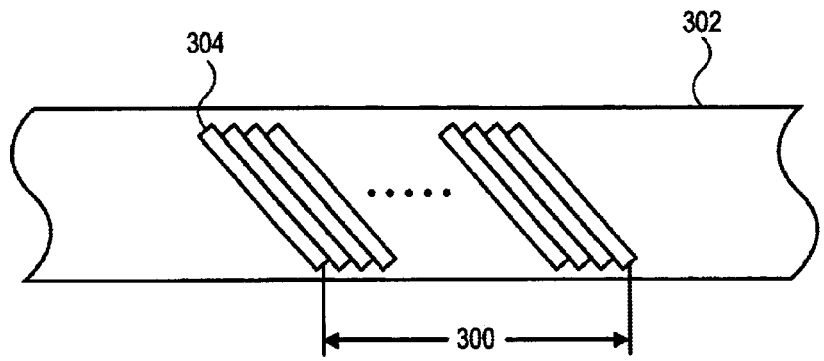
FIG. 3 is a schematic view illustrating one embodiment of a group of data stored on a magnetic tape using a helical scan technique.

FIG. 3 is a schematic view illustrating one embodiment of a group 300 of data stored on a magnetic tape 302 using a helical scan technique. Tracks 304 of data are recorded at an angle in relation to the sides of magnetic tape 302. One group 300 contains 40 tracks 304. Recording tracks 304 at an angle increases the amount of data that can be stored on magnetic tape 302. In an alternative embodiment, data is stored on magnetic tape 302 using a linear recording technique. The linear recording technique may employ a serpentine recording technique.

Figure 4:
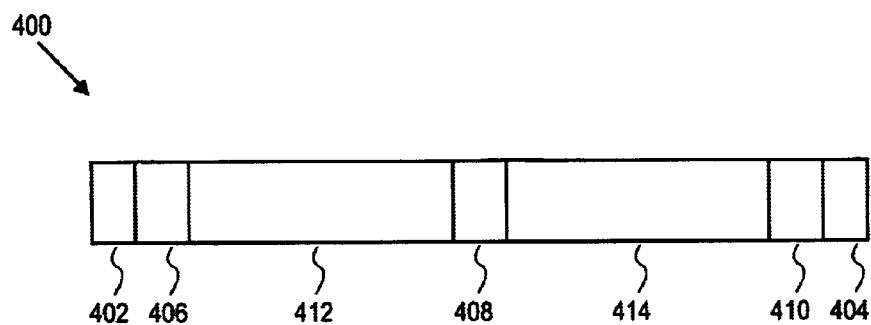
FIG. 4 is a schematic view illustrating one embodiment of a track of data stored on a magnetic tape.

FIG. 4 is a schematic view illustrating one embodiment of a track 400 of data stored on a magnetic tape. In one embodiment, track 400 corresponds to track 304 discussed above with respect to FIG. 3. Track 400 may be 471 blocks in length. A block is discussed below with respect to FIG. 5. Track 400 may include margins 402 and 404, auto tracking following (ATF) areas 406, 408, and 410, and data areas 412 and 414. Margins 402 and 404 are located at either end of track 400 and each may be 4 blocks in length. Following left margin 402 are ATF area 406, data area 412, ATF area 408, data area 414, and ATF area 410. ATF areas 406, 408, and 410 provide a closed-loop, self-adjusting path for tape tracking, and each may be 5 blocks in length. ATF areas 406, 408, and 410 enable a magnetic tape drive to self-adjust for tape flutter, thereby allowing successive tracks to be written more closely together for increased recording density. Data areas 412 and 414 contain user data and each may be 224 blocks in length.

Figure 5:
FIG. 5 is a schematic view illustrating one embodiment of a block of data stored on a magnetic tape.
Figure 6:
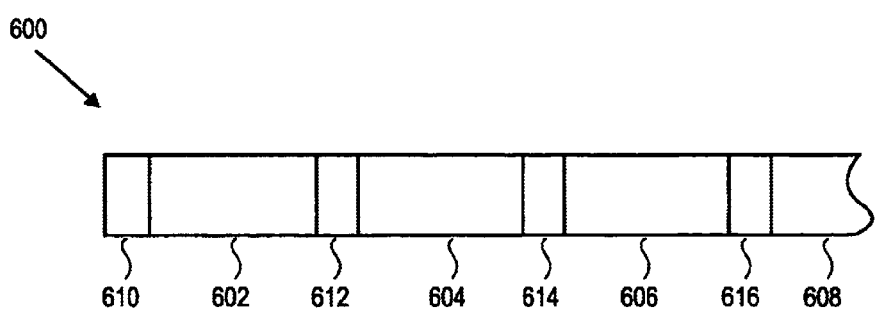
FIG. 6 is a schematic view illustrating one embodiment of a magnetic tape formatted to include a series of partitions.

FIG. 5 is a schematic view illustrating one embodiment of a block 500 of data stored on a magnetic tape. Block 500 includes a sync area 502, an ID area 504, a parity area 506, and a data area 508. Sync area 502 may be 1 byte in length. ID area 504 is used by a magnetic tape drive to locate data, and may be 6 bytes in length. Parity area 506 may be 2 bytes in length. Data area 504 may be 64 bytes in FIG. 6 is a schematic view illustrating one embodiment of a magnetic tape 600 formatted to include a series of partitions 602, 604, 606 and 608. Device area 610 may be located at the beginning of magnetic tape 600, and device areas 612, 614, and 616 may separate partitions 602, 604, 606 and 608. Partitions 602, 604, 606 and 608 may enable a tape drive to quickly access a particular data file. In one embodiment, magnetic tape 600 may be divided into up to 256 partitions. Device areas 610, 612, 614, and 616 provide load/unload points for a magnetic tape drive. Device areas located between partitions enable a magnetic tape drive to load or unload magnetic tape 600 at any partition, rather than requiring the magnetic tape drive to load or unload magnetic tape 600 before the first partition 602.

Figure 7:
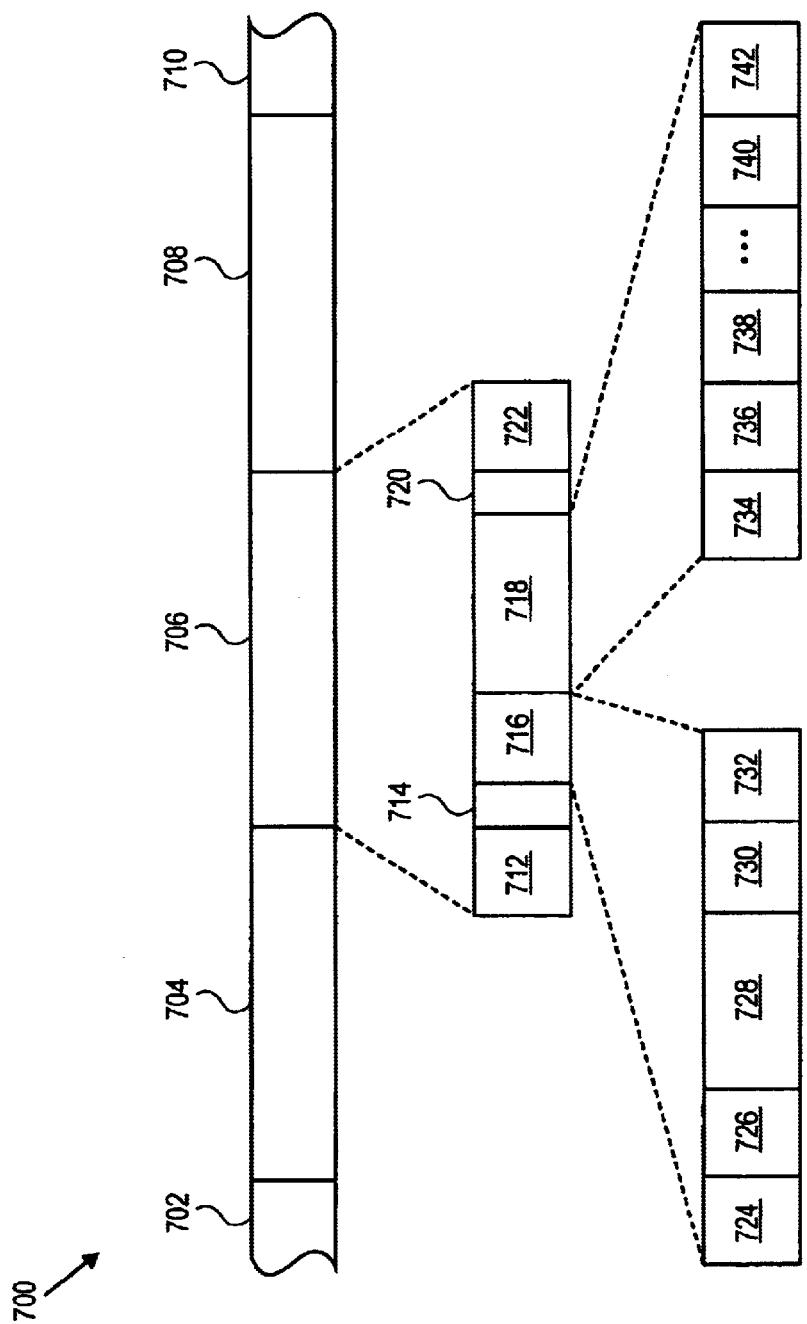
FIG. 7 is a schematic view illustrating one embodiment of a magnetic tape formatted for use with a magnetic tape cartridge having a non-volatile memory.

FIG. 7 is a schematic view illustrating one embodiment of a magnetic tape 700 formatted for use with a magnetic tape cartridge having a non-volatile memory. Magnetic tape 700 includes a series of partitions 702, 704, 706, 708, and 710. Partition 706 is divided into a reference area 712, a position tolerance band 714, a system area 716, a data area 718, an end of data (EOD) marker 720, and a device area 722. EOD marker 720 may indicate the end of the last recorded data on magnetic tape 700. System area 716 is divided into a system preamble 724, a system log 726, a system postamble 728, a position tolerance band 730, and a vendor group preamble 732. Data area 718 is divided into vendor group 734, groups 736, 738, and 740 (such as group 300 described above with reference to FIG. 3), and amble frame 742.

Figure 8A:
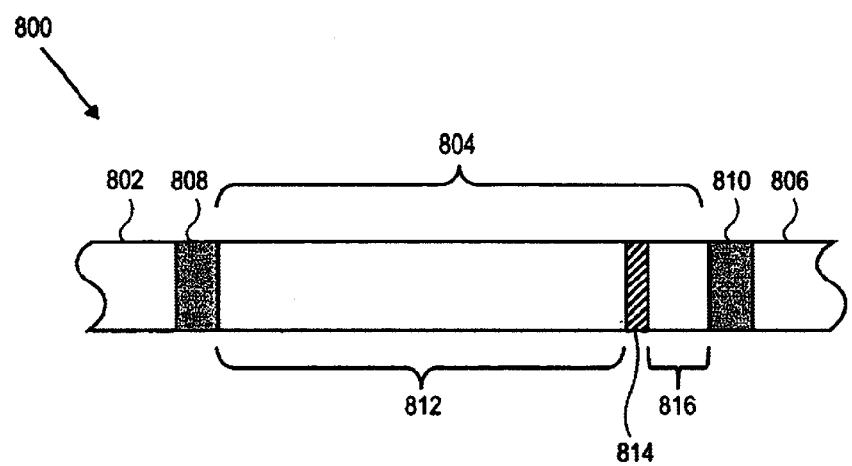
FIG. 8A is a schematic view illustrating one embodiment of a magnetic tape prior to an overwrite operation.

FIG. 8A is a schematic view illustrating one embodiment of a magnetic tape 800 prior to an overwrite operation. In one embodiment, magnetic tape 800 may correspond to magnetic tape 700 described above with reference to FIG. 7. Magnetic tape 800 may have a series of partitions 802, 804, and 806. Partition 802, 804, or 806 may correspond to partition 702, 704, 706, 708, or 710 described above with reference to FIG. 7. Device areas 808 and 810 may be located, respectively, before and after partition 804, and may provide load/unload points for a magnetic tape drive. Device area 808 or 810 may correspond to device area 722 described above with reference to FIG. 7.

Magnetic tape 800 may have original data 812 that is written to magnetic tape 800 during an initial write operation. Data may also be stored in partitions 802 and 806. An original EOD marker 814 may indicate the end of original data 812 within partition 804. Original EOD marker 814 may correspond to EOD marker 720 described above with reference to FIG. 7. If partitions 802 and 806 also contain data, then partitions 802 and 806 may also contain an EOD marker indicating the end of data within each partition. If the entire length of partition 804 is not filled with original data 812, there may be unused tape 816 between original EOD marker 814 and device area 810. No data is stored in unused tape 816.

Figure 8B:
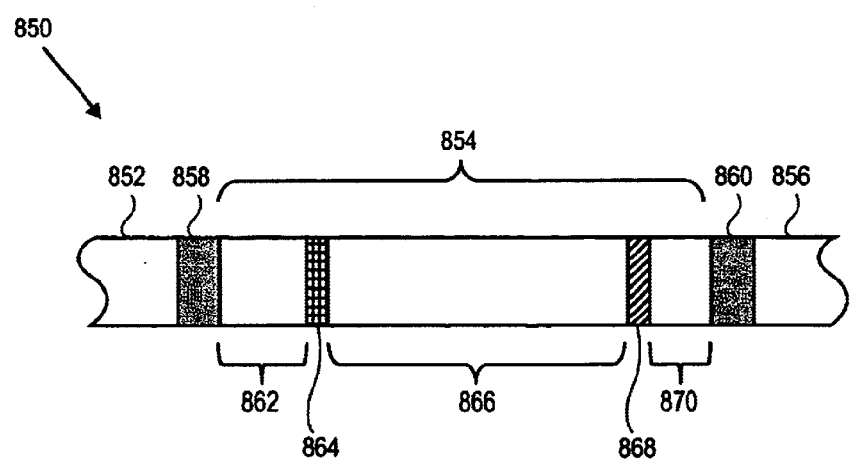
FIG. 8B is a schematic view illustrating one embodiment of a magnetic tape after an overwrite operation.

FIG. 8B is a schematic view illustrating one embodiment of a magnetic tape 850 after an overwrite operation. Magnetic tape 850 may have a series of partitions 852, 854, and 856. Partitions 852, 854, and 856 may correspond to partitions 802, 804, and 806 described above with reference to FIG. 8A. Device areas 858 and 860 may be located, respectively, before and after partition 854, and may provide load/unload points for a magnetic tape drive. Device areas 858 and 860 may correspond to device areas 808 and 810 described above with reference to FIG. 8A. Magnetic tape 850 may have new data 862 that is written to magnetic tape 850 during an overwrite operation. A new EOD marker 864 may indicate the end of new data 862 within partition 854.

Magnetic tape 850 may include recoverable data 866. Recoverable data 866 may be data that was written to magnetic tape 850 during an initial write operation and not overwritten during an overwrite operation. In one embodiment, recoverable data 866 may correspond to the portion of original data 812, described above with reference to FIG. 8A, that is located to the right of new EOD marker 864. A user may wish to read recoverable data 866 to recover the portion of original data 812 that was not overwritten during the overwrite operation.

Magnetic tape 850 may also include original EOD marker 868 that indicates the end of recoverable data 866. Original EOD marker 814 may correspond to original EOD marker 808 described above with reference to FIG. 8A. If less than the entire length of partition 854 is filled with new data 862 and recoverable data 866, there may be unused tape 870 between original EOD marker 868 and device area 860.

It will be apparent that, if new data 862 written to the magnetic tape during an overwrite operation extends past original data 812, there may be no recoverable data 866 on magnetic tape. Furthermore, original EOD marker 814 may be overwritten by new data 862.

Figure 9:
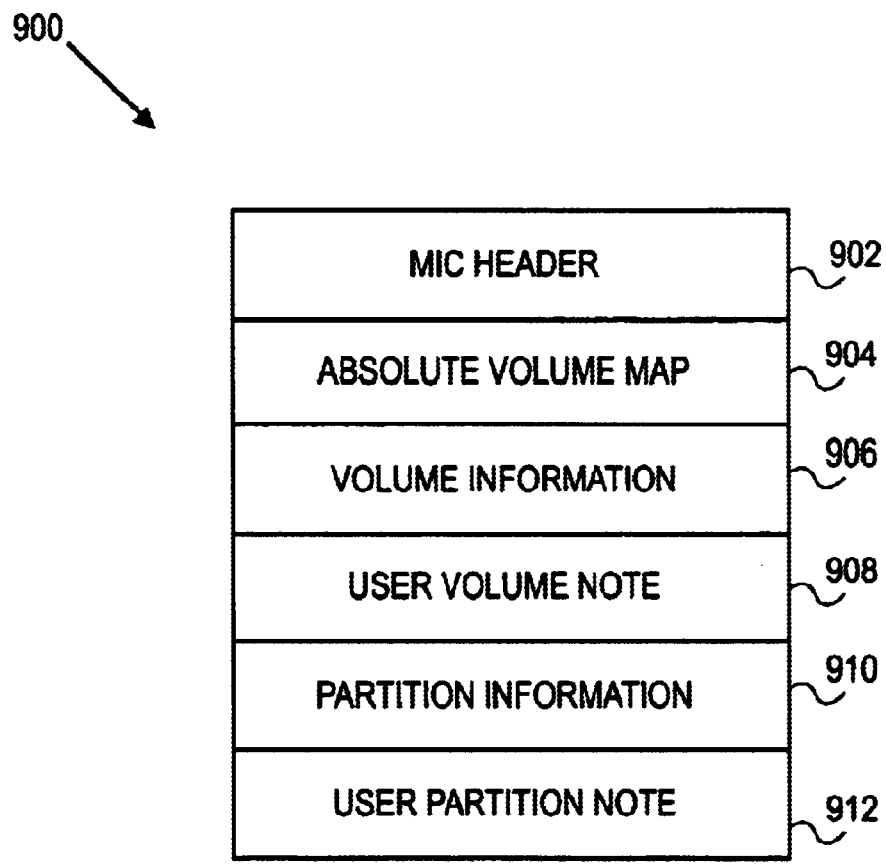
FIG. 9 is a schematic view illustrating one embodiment of record formats for a non-volatile memory disposed on a magnetic tape cartridge.

FIG. 9 is a schematic view illustrating one embodiment of a record format 900 for a non-volatile memory disposed on a magnetic tape cartridge. In one embodiment, the non-volatile memory that contains record format 900 is non-volatile memory 114 described above with reference to FIG. 1. Record format 900 may include a header 902, an absolute volume map 904, volume information 906, a user volume note 908, partition information 910, and a user partition note 912. A read-past-EOD marker flag may be stored in one of these locations within the non-volatile memory.

Figure 10:
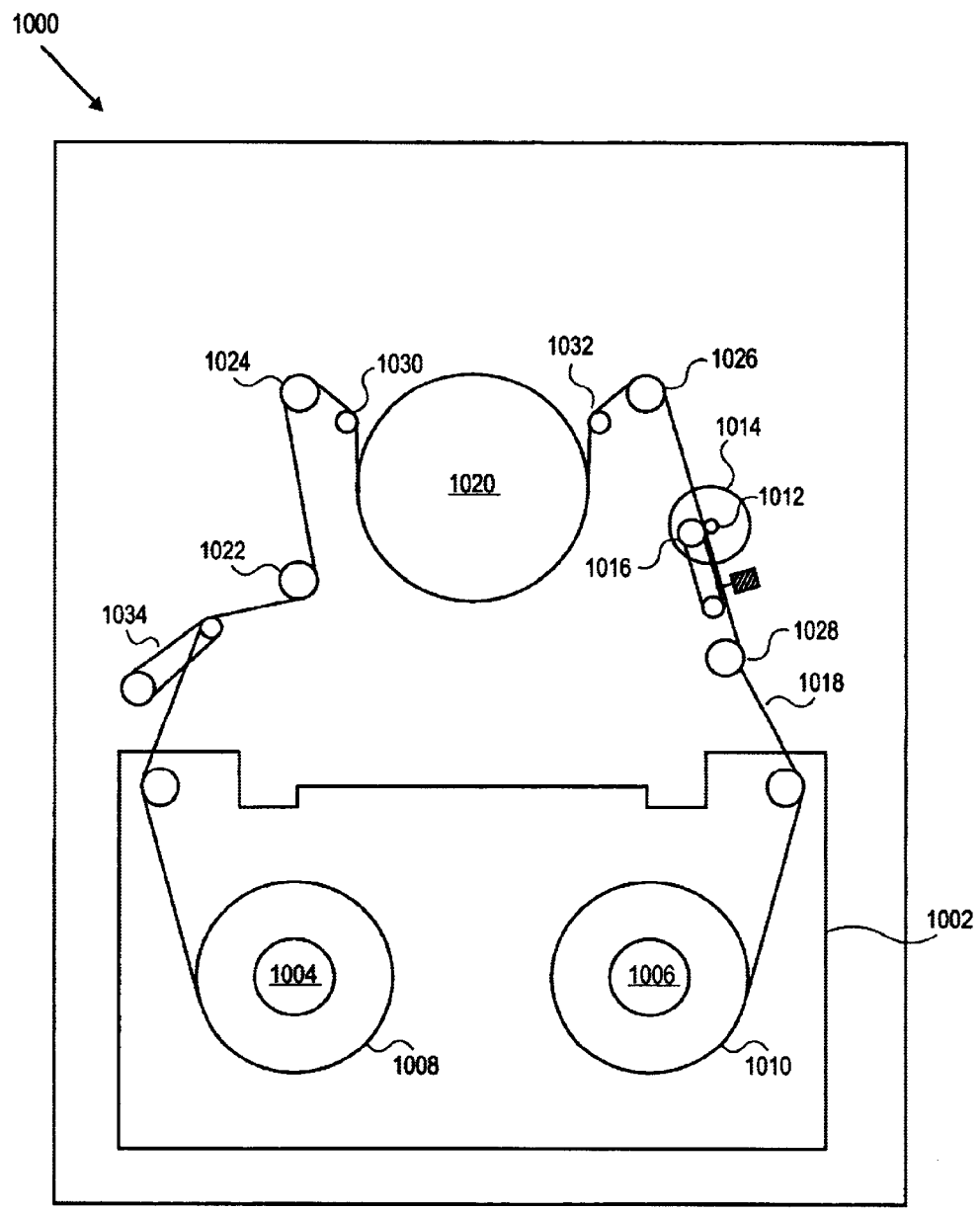
FIG. 10 is a plan view illustrating one embodiment of a magnetic tape drive 1000.

FIG. 10 is a plan view illustrating one embodiment of a magnetic tape drive 1000. In one embodiment, magnetic tape drive 1000 is compatible with a magnetic tape cartridge 1002 having a non-volatile memory (not shown). Magnetic tape cartridge 1002 may be magnetic tape cartridge 100 described above with reference to FIG. 1. Magnetic tape drive may include sprockets 1004 and 1006 that engage spools 1008 and 1010 in magnetic tape cartridge 1002. A capstan shaft 1012 is connected to a capstan motor 1014. A pinch roller 1016 applies pressure to a magnetic tape 1018 such that magnetic tape 1018 is tight against capstan shaft 1012. Capstan motor 1014 rotates at an approximately constant velocity, causing magnetic tape 1018 to move past one or more read/write heads 1020. Guides 1022, 1024, 1026, and 1028, slant pins 1030 and 1032, and swing arm 1034 guide magnetic tape 1018 past read/write head 1020.

Read/write head 1020 typically is a ring-shaped electromagnet having a ferrous core. The core is broken at an air gap, around which is a fringing magnetic field. To write data to magnetic tape 1018, magnetic tape drive 1000 passes magnetic tape 1018 through the fringing magnetic field at an approximately constant velocity while a signal current is applied to the electromagnet, causing magnetic tape 1018 to become magnetized. To read data from magnetic tape 1018, magnetic tape drive 1000 passes magnetic tape 1018 through the fringing magnetic field at an approximately constant velocity, and the magnetic field created by the magnetization of magnetic tape 1018 induces a voltage in the electromagnet that can be interpreted as data by magnetic tape drive 1000.

Magnetic tape drive 1000 may be an internal magnetic tape drive or an external magnetic tape drive. An example of an internal tape drive adapted to communicate with a non-volatile memory in a magnetic tape cartridge is the Sony AIT-2 Internal Drive, manufactured by Sony Electronics, Inc. of Tokyo, Japan. An example of an external tape drive adapted to communicate with a non-volatile memory in a magnetic tape cartridge is the Sony AIT-2 External Drive, manufactured by Sony Electronics, Inc. of Tokyo, Japan.

Figure 11:
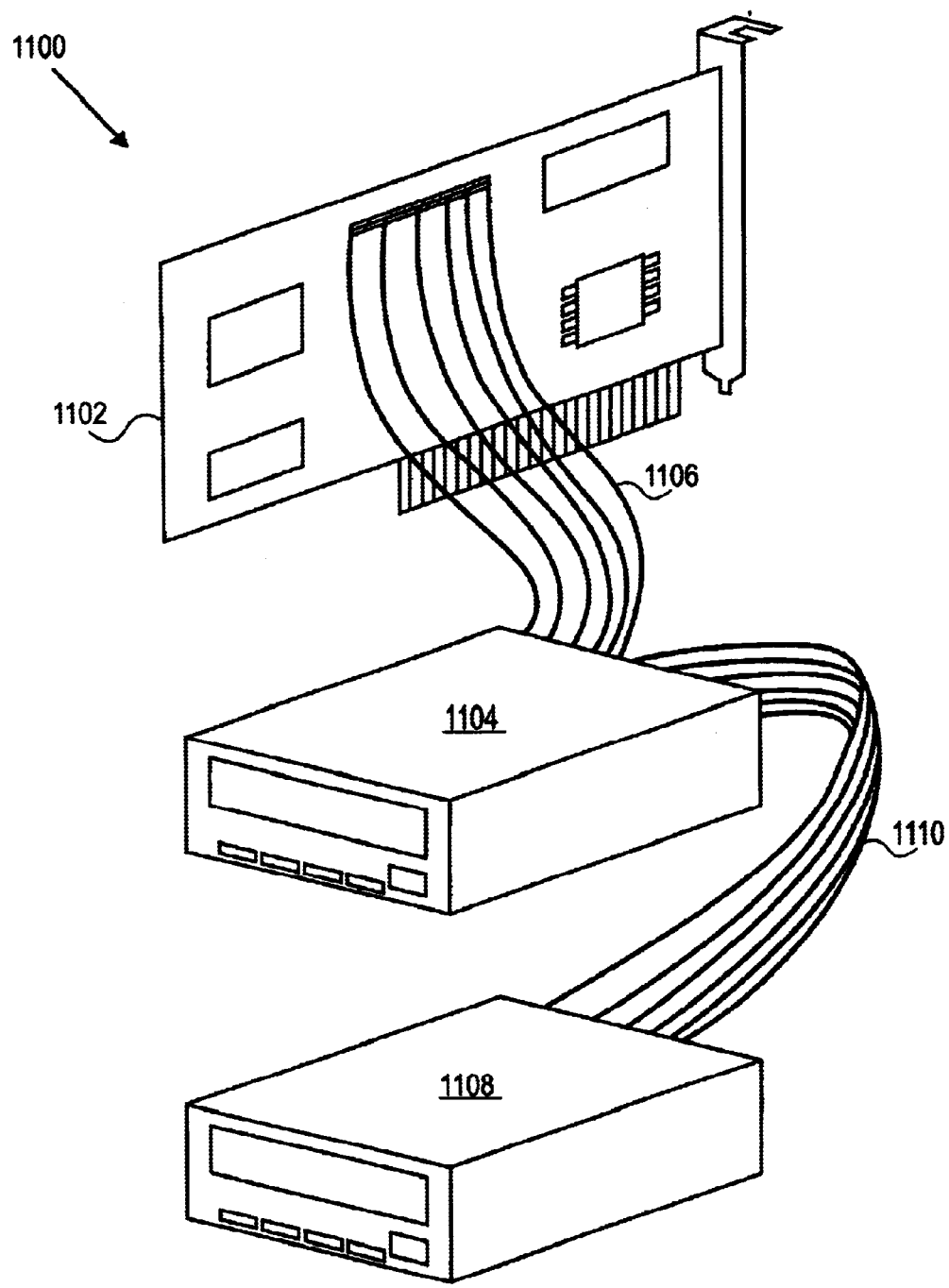
FIG. 11 is a perspective view illustrating one embodiment of a SCSI interface coupled with an internal magnetic tape drive.

FIG. 11 is a perspective view illustrating one embodiment of a SCSI interface 1100. SCSI interface 1100 includes a host adapter 1102 that is coupled with an internal magnetic tape drive 1104. Host adapter 1102 may be an expansion board that plugs into an expansion slot in a computer. In one embodiment, the computer is a network server. A cable 1106 connects host adapter 1102 with internal magnetic tape drive 1104. In one embodiment, a second internal magnetic tape drive 1108 is connected to internal magnetic tape drive 1104 via a second cable 1110.

SCSI interface 1100 enables multiple SCSI peripheral devices, such as internal magnetic tape drive 1104 and second internal magnetic tape drive 1108, to connect to a single host adapter 1102. Each SCSI peripheral device has a first port (not shown) and a second port (not shown). The first port in internal magnetic tape drive 1104 is connected directly to host adapter 1102 via cable 1106. The first port in second internal magnetic tape drive 1108 connects with the second port in internal magnetic tape drive 1104 via second cable 1110. Thus, multiple internal tape drives may be connected with a single SCSI host adapter 1102.

Figure 12:
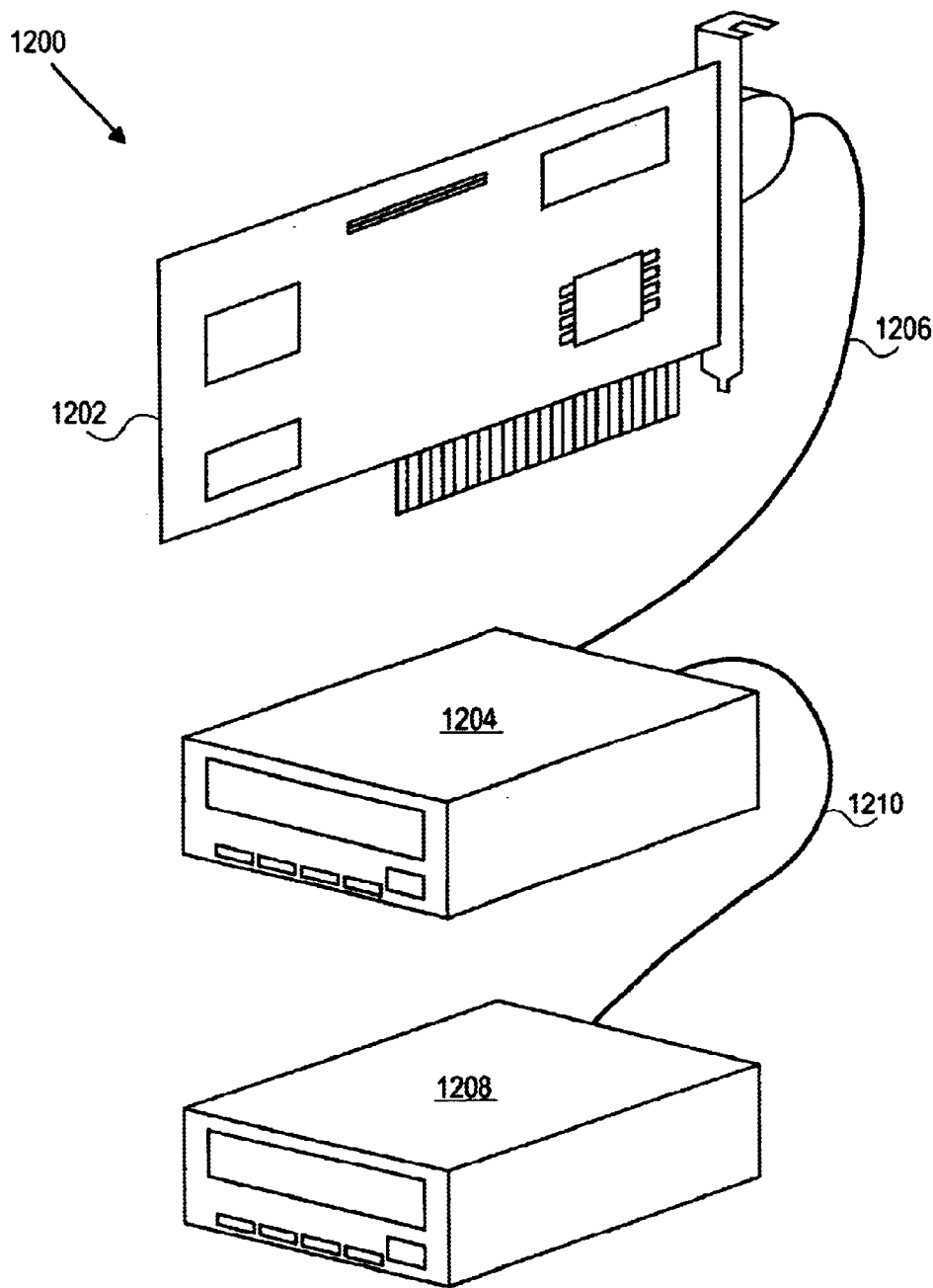
FIG. 12 is a perspective view illustrating one embodiment of a SCSI interface coupled with an external magnetic tape drive.

FIG. 12 is a perspective view illustrating another embodiment of a SCSI interface 1200. SCSI interface 1200 includes a host adapter 1202 that is coupled with an external magnetic tape drive 1204. Host adapter 1202 may be an expansion board that plugs into an expansion slot in a computer. In one embodiment, the computer is a network server. A cable 1206 connects host adapter 1202 with external magnetic tape drive 1204. In one embodiment, a second external magnetic tape drive 1208 is connected to external magnetic tape drive 1204 via a second cable 1210. In one embodiment, host adapter 1202 may be connected with both internal magnetic tape drives, such as internal magnetic tape drive 1104 and second internal magnetic tape drive 1108 discussed above with reference to FIG. 11, and external magnetic tape drives, such as external magnetic tape drive 1204 and second external magnetic tape drive 1208.

Figure 13:
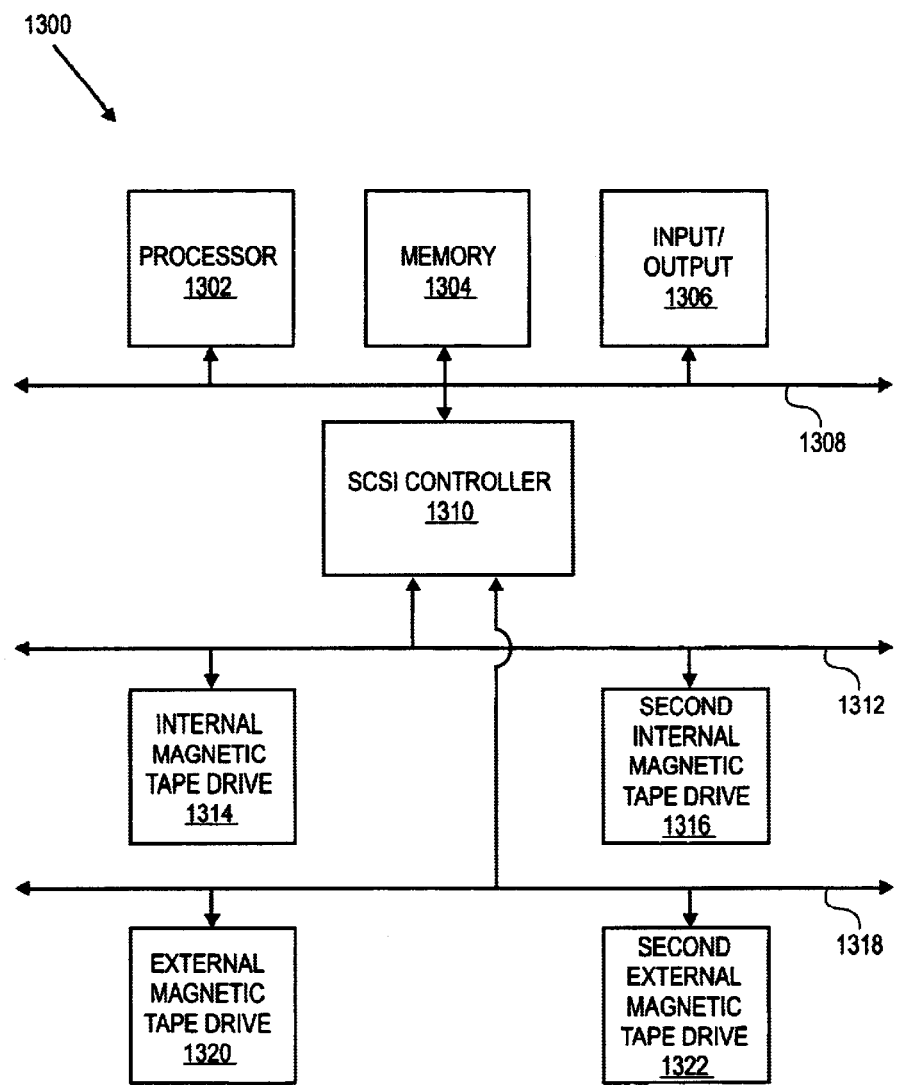
FIG. 13 is a block diagram illustrating one embodiment of a SCSI interface coupled with a magnetic tape drive.

FIG. 13 is a block diagram illustrating one embodiment of a computer system 1300 having a SCSI interface. Computer system includes a processor 1302, memory 1304, and input/output devices 1306. Processor 1302, memory 1304, and input/output devices 1306 are connected via system bus 1308. Memory 1304 is configured to store instructions that, when executed by processor 1302, cause computer system 1300 to perform the method described herein. Input/output devices 1306 may include a keyboard, a mouse or other pointing device, a digital camera, a scanner, a disk drive, a tape drive, a monitor, and a printer.

Computer system may also include SCSI host adapter 1310. SCSI host adapter 1310 may be SCSI host adapter 1102 discussed above with reference to FIG. 11, or SCSI host adapter 1202 discussed above with reference to FIG. 12. SCSI host adapter 1310 is connected to processor 1302, memory 1304, and input/output devices 1306 via system bus 1308. Multiple internal peripheral devices may be connected to SCSI host adapter 1310 via internal SCSI bus 1312. Internal peripheral devices may include internal magnetic tape drive 1314 and second internal magnetic tape drive 1316. Multiple external peripheral devices may be connected to SCSI host adapter 1310 via external SCSI bus 1318. External peripheral devices may include external magnetic tape drive 1320 and second external magnetic tape drive 1322.

Each peripheral device may contain a controller (not shown). The controller controls the exchange of information between the peripheral and processor 1302. Thus, if the peripheral is a magnetic tape drive, the controller controls the exchange of information between a magnetic tape cartridge inserted in the magnetic tape drive and processor 1302. If the magnetic tape cartridge has a non-volatile memory, such as EEPROM, the controller also controls the exchange of information between the non-volatile memory and processor 1302. The exchange of information between the non-volatile memory and processor 1302 occurs via SCSI host adapter 1310.

In one embodiment, SCSI host adapter 1310 provides a SCSI command to a magnetic tape drive, causing the magnetic tape drive to set a read-past-EOD marker flag to the "on" position. The read-past-EOD marker flag may be located in non-volatile memory in a magnetic tape cartridge inserted into the magnetic tape drive. When the read-past-EOD marker flag is in the "on" position, the magnetic tape drive will read past an EOD marker stored on the magnetic tape inside the magnetic tape cartridge. Thus, if a user has accidentally overwritten data, the user can recover that portion of the data that is past the EOD marker indicated the end of the new data. When the read-past-EOD marker is in the "off" position, the magnetic tape drive will not read past an EOD marker on the magnetic tape.

Figure 14:
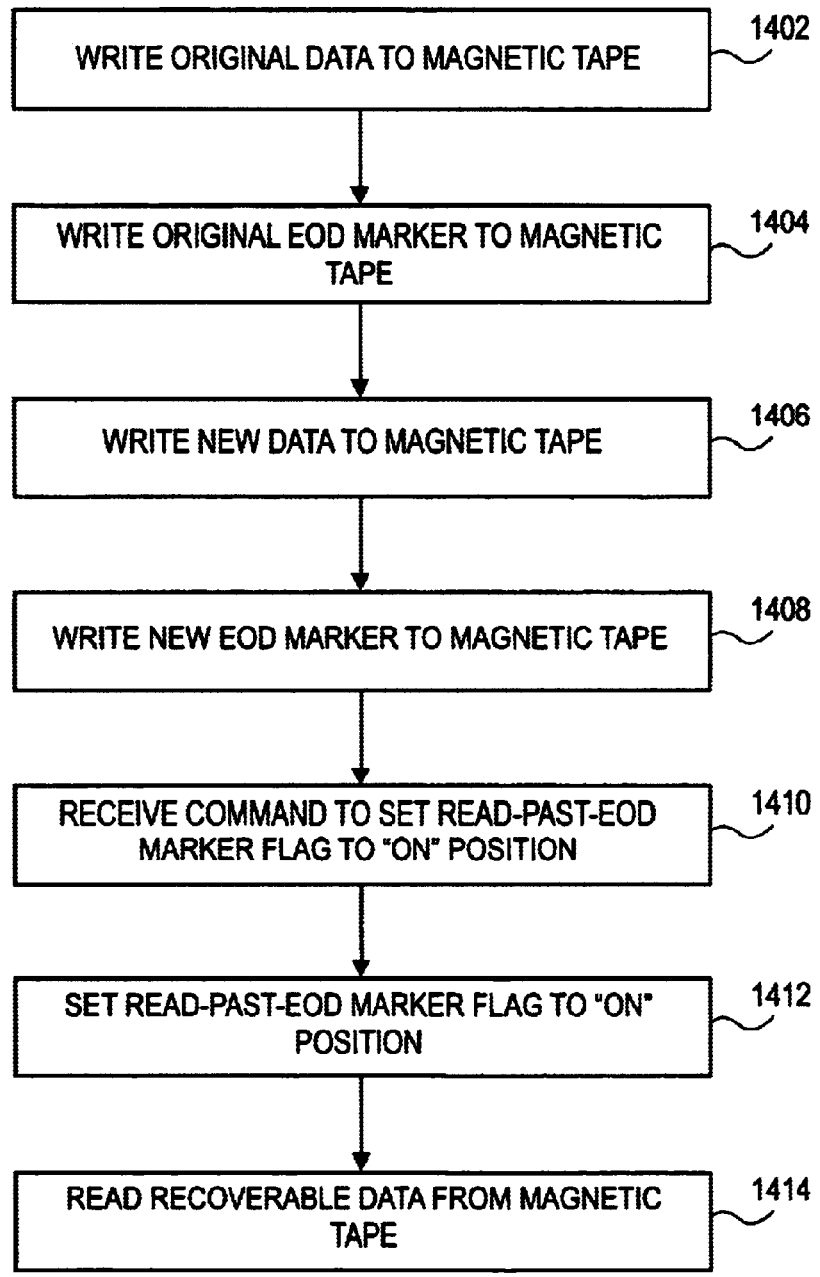
FIG. 14 is a flow diagram illustrating one embodiment of using a flag to read past an EOD marker.

FIG. 14 is a flow diagram illustrating one embodiment of using a flag to read past an EOD marker. Original data is written to a magnetic tape, 1402. An original EOD marker is written to the magnetic tape, 1404. In one embodiment, the original EOD marker immediately follows the last bit of original data written to magnetic tape during the write operation of step 1402. Thus, original EOD marker may indicate to a magnetic tape drive the location of the last bit of original data written to the magnetic tape during the write operation of step 1402.

Next, new data is written to the magnetic tape, 1406. The new data may be written during an overwrite operation, in which at least a portion of the original data written in step 1402 is overwritten. A new EOD marker is then written to the magnetic tape, 1408. In one embodiment, the new EOD marker immediately follows the last bit of new data written to the magnetic tape during the write operation of step 1406. Thus, new EOD marker may indicate to a magnetic tape drive the location of the last bit of new data written to the magnetic tape during the overwrite operation of step 1406.

A command is received to set a read-past-EOD marker flat to an "on" position, 1410. In one embodiment, the command is a SCSI command received from a SCSI host adapter. The read-past-EOD marker flag may be located in a non-volatile memory coupled with a magnetic tape cartridge. The read-past-EOD marker flag is then set to the "on" position, 1412. In one embodiment, a controller in a magnetic drive sets the read-past-EOD marker flag to the "on" position by setting a bit in the non-volatile memory to a particular logic value. In one embodiment, a magnetic tape drive will read past an EOD marker written to the magnetic tape during the write operation of step 1408 when the read-past-EOD marker flag is set to the "on" position. The magnetic tape will not read past the EOD marker when the read-past-EOD marker flag is set to the "off" position. By setting the read-past-EOD marker value to the "on" position, the magnetic tape drive is able to read recoverable data that was written to the magnetic tape during the write operation of step 1402 and remains on the magnetic tape after the write operation of step 1406.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A data storage device comprising:
    a magnetic tape coiled around a first spool;
    an EOD marker stored on the magnetic tape; and
    a read-past-EOD marker flag stored on a media selected from the group consisting of the magnetic tape and a non-volatile memory coupled with the data storage device,
    wherein the read-past-EOD marker flag, when set to an "on" position, enables a magnetic tape drive to read past the EOD marker and when set to an "off" position, prevents the magnetic tape drive from reading past the EOD marker.

2. The data storage device of claim 1 further comprising a second spool, and wherein the magnetic tape extends between the first spool and the second spool such that, as the first spool and the second spool rotate, a portion of the magnetic tape is supplied by the first spool and taken up by the second spool.

3. The data storage device of claim 1 wherein the non-volatile memory is selected from the group consisting of EPROM, EEPROM, and flash memory.

4. The data storage device of claim 1 further comprising recoverable data stored on the magnetic tape.

5. The data storage device of claim 4 further comprising new data stored on the magnetic tape.

6. The data storage device of claim 5 wherein the EOD marker is located between the new data and the recoverable data on the magnetic tape.

7. A method comprising:
   receiving a command to set a read-past-EOD marker flag to an "on" position;
   setting the read-past-EOD marker flag to the "on" position; and
   reading recoverable data located between a new EOD marker and an original EOD marker on a magnetic tape,
wherein an "off" position of the read-past-EOD marker flag prevents reading past the new EOD marker and the read-past-EOD marker flag is stored on a media selected from the group consisting of the magnetic tape and a non-volatile memory coupled with a data storage device.

8. The method of claim 7 further comprising writing original data to the magnetic tape.

9. The method of claim 8 further comprising writing an original EOD marker to the magnetic tape, wherein the original EOD marker is written after the original data.

10. The method of claim 9 further comprising writing new data to the magnetic tape, wherein at least a portion of the new data is written over the original data.

11. The method of claim 10 further comprising writing a new EOD marker to the magnetic tape, wherein the new EOD marker is written after the new data.

12. The method of claim 11 wherein the original data located between the new EOD marker and the original EOD marker is recoverable data.

13. A machine-readable medium having machine-executable instructions to a cause a machine to perform a method comprising:
   receiving a command to set a read-past-EOD marker flag to an "on" position;
   setting the read-past-EOD marker flag to the "on" position; and
   reading recoverable data located between a new EOD marker and an original EOD marker on a magnetic tape,
wherein an "off" position of the read-past-EOD marker flag prevents reading past the new EOD marker and the read-past-EOD marker flag is stored on a media selected from the group consisting of the magnetic tape and a non-volatile memory coupled with a data storage device.

14. A sequential data storage device comprising:
   a non-volatile memory having stored therein a read-past-EOD marker flag specifying whether a controller can access data located between a new EOD marker and an original EOD marker on the sequential data storage device, wherein an "on" position of the read-past-EOD marker flag enables access to the data and an "off" position prevents access to the data.

15. A controller comprising:
   means for setting a read-past-EOD marker flag in a non-volatile memory in a sequential data storage device; and
   means for reading data on the sequential data storage device, the means for reading accessing data located between a new EOD marker and an original EOD marker when the read-past-EOD marker flag is set to an "on" position and wherein the means for reading does not access the data when the read-past-EOD marker flag is set to an "off" position.

* * * * *